United States Patent [19]

Koyama et al.

[11] 4,398,968
[45] Aug. 16, 1983

[54] METHOD OF BORONIZING TRANSITION METAL SURFACES

[75] Inventors: Koichiro Koyama, Hyogo, Japan; Hiroshi Shimotake, Hinsdale, Ill.

[73] Assignee: The United States of America as represented by the U.S. Department of Energy, Washington, D.C.

[21] Appl. No.: 297,310

[22] Filed: Aug. 28, 1981

[51] Int. Cl.$^3$ .............................................. B05D 5/12
[52] U.S. Cl. .................................. 148/6.11; 427/431; 427/432; 427/435; 204/39
[58] Field of Search ...................... 427/435, 431, 432; 148/6.11; 204/39

[56] References Cited

U.S. PATENT DOCUMENTS

| | | | |
|---|---|---|---|
| 2,572,249 | 10/1951 | Cooper | 204/60 |
| 3,024,176 | 3/1962 | Cook | 204/39 |
| 3,634,145 | 1/1972 | Homan | 264/39 |
| 3,770,512 | 11/1973 | Bopp | 148/6 |
| 3,880,729 | 4/1975 | Kellner | 204/39 |

Primary Examiner—Michael R. Lusignan
Assistant Examiner—Richard Bueker
Attorney, Agent, or Firm—Hugh W. Glenn; Robert J. Fisher; Richard G. Besha

[57] ABSTRACT

A method is presented for preparing a boride layer on a transition metal substrate for use in corrosive environments or as a harden surface in machine applications. This method is particularly useful in treating current collectors for use within a high temperature and corrosive electrochemical cell environment. A melt of a alkali metal boride tetrafluoride salt including such as KF to lower its melting point is prepared including a dissolved boron containing material, for instance NiB, $MnB_2$, or $CrB_2$. A transition metal to be coated is immersed in the melt at a temperature of no more than 700° C. and a surface boride layer of that transition metal is formed within a period of about 24 hours on the substrate surface.

10 Claims, 4 Drawing Figures

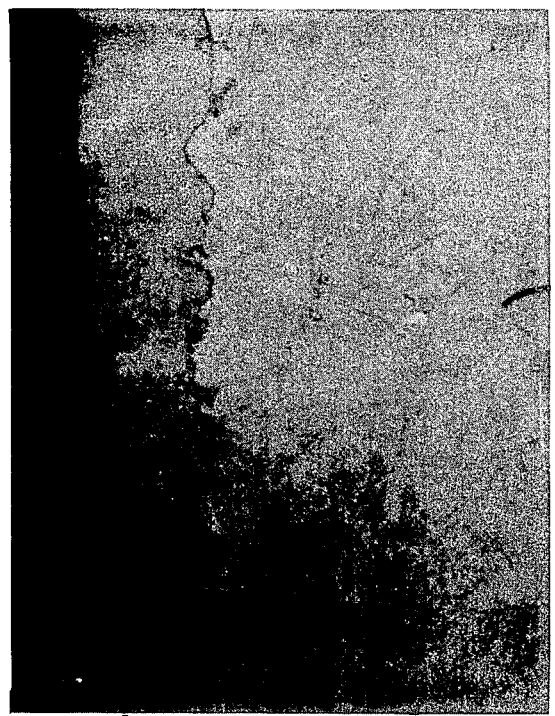
FIG 1-a
FIG 1-b
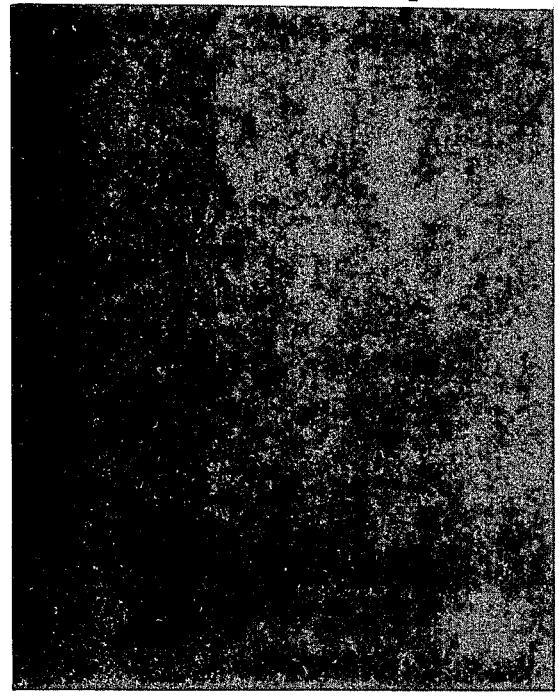

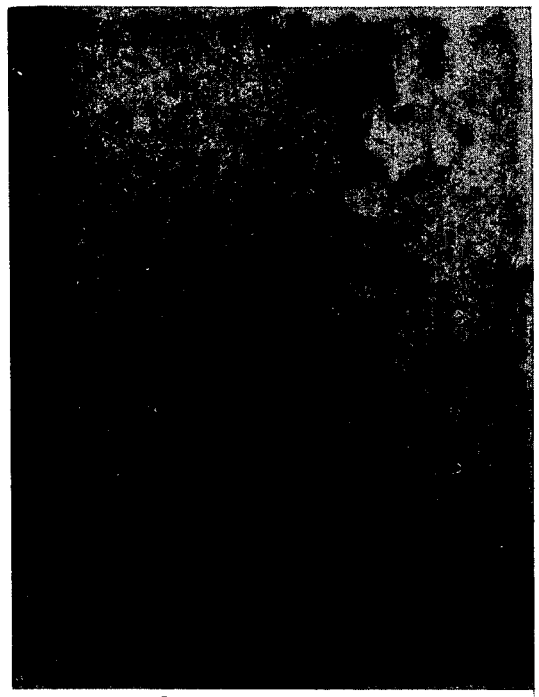
FIG 1-c
FIG 1-d

METHOD OF BORONIZING TRANSITION METAL SURFACES

CONTRACTUAL ORIGIN OF THE INVENTION

The United States Government has rights in this invention pursuant to Contract No. W-31-109-ENG-38 between the U.S. Department of Energy and Argonne National Laboratory.

BACKGROUND OF THE INVENTION

The present invention relates to a method for combining boron into the surface layers of a transition metal. Metals treated in this manner have use in corrosive environments where their untreated substrates may otherwise be severely attacked The method is of particular interest in treating current collectors for use in high temperature electrochemical cells employing molten alkali metal halides as electrolytes. One other important application is the hardening of metal surfaces to resist wear in mechanical parts.

One type of high temperature secondary electrochemical cells contemplated employ chalcogens such as sulfur, oxygen selenium or tellurium as well as their transition metal chalcogenides as positive electrode materials. Of particular interest at present are positive electrodes including the sulfides of iron. The negative electrodes in such cells include alkali metals such as lithium, sodium or potassium or alkaline earth metals such as calcium, magnesium and alloys of these materials as negative electrode reactants. An extremely corrosive environment is produced by these reactants and the molten halide salts that ordinarily are used in these type cells as electrolyte. For instance, a cell such as an $FeS_2$/LiCl-KCl/LiAl presents a difficult problem for selection of a current collector material for the positive electrode. At present molybdenum and molybdenum alloys are considered suitable for this application but these materials are quite expensive.

Representative publications illustrating the field of the present invention include the following.

U.S. Pat. No. 4,172,926, Oct. 30, 1979 to Shimotake et al illustrates a high temperature electrochemical cell that could benefit from current collector material prepared by the method of the present invention.

ANL 78-94 "High Performance Batteries for Electric Vehicle Propulsion and Stationary Energy Storage", October 77-September 78, pages 144-147 show the use of iron boride and other boride coatings on current collectors within $FeS_2$ electrodes in an effort to reduce corrosion. The coating was prepared by a gaseous diffusion process using a pack cementation method.

Epik "Boron and Refractory Borides" edited by V.I. Matkovich, page 597, Springer-Verlag 1977 shows a variety of methods for boronizing metals. The metals are (1) immersed in a molten salt without applied potential, (2) subjected to chemical vapor deposition, (3) subjected to electrolysis in a molten salt bath or (4) packed in a powder including boron containing materials. In each of these methods, temperatures typically of 850°-1000° C. are employed.

Komatsu et al, J. Japan Institute Metals, 38, page 481, (1974) describes the use of a powder pack with $KBF_4$ and ferroboron for preparing iron boron coatings on iron substrates at temperatures as low as 600° C.

Molybdenum metal is one of the few materials suitable for the positive current collectors of $FeS_2$ electrodes within high temperature, molten salt electrochemical cells. However, because of the high cost and poor fabricability of molybdenum metal, efforts to find alternative positive current collector materials have been made.

Electronically conductive ceramic coatings such as the borides on metallic substrates have been considered for current collector use. Various methods for producing boron coatings particularly on iron substrates have been attempted. Iron boron coatings have been prepared by electrolysis from a molten alkali metal halide baths at temperatures typically of 900° C. but such coatings have failed to provide good corrosion resistance within a cell environment. Other boride coatings on iron have been prepared by packing a ceramic powder with boron containing materials closely around the substrate and heating to elevated temperatures. Also chemical deposition of such as titanium diboride from vapor has been attempted. Coatings prepared by these methods have shown poor stability in $FeS_2$ and LiCl-KCl at temperatures around 500° C. Often micrometer size cracks resulted from the extreme thermal cycles required in applying the boron coating to the substrate metal.

SUMMARY OF THE INVENTION

In view of the above it is therefore an object of the present invention to provide an improved method of boronizing surface layers of transition metal substrates.

It is a further object to provide a method of applying a surface layer including metal boride on a current collector structure for use in electrodes of high temperature cells employing molten salt electrolyte.

It is also an object to provide a method of applying a boride coating to a transition metal substrate at a sufficiently low temperature to minimize the formation of micrometer size cracks resulting from differences in thermal expansion of the layer and substrate.

It is yet another object to provide a method of forming a boride surface layer on a nickel substrate for use as current collector material within a positive electrode of a molten salt, high temperature electrochemical cell.

It is also an object to provide a method of applying a boride coating on a transition metal substrate in which the coating comprises substantially a single phase of boride material.

In accordance with the present invention, a method of boronizing a transition metal substrate is provided. A melt including an alkali metal boron tetraflouride salt is prepared with a dissolved boron-containing material. The transition metal is immersed in the melt at a temperature of no more than 700° C. for a sufficient period to form a surface layer on the transition metal containing a transition metal boride.

In more specific aspects of the invention, the boron containing material is selected from $CrB_2$, $MnB_2$, NiB, FeB, $ZrB_{12}$ and $GdB_6$. More preferably, the boron containing material is of $CrB_2$, $MnB_2$ or NiB. The method is particularly applicable to applying boride coatings on nickel substrates and NiB is a particularly preferred boron-containing material.

In other aspects of the invention, the alkali metal boron tetraflouride melt includes a minor proportion of KF sufficient to lower the melting point of the mixture to temperatures permitting molten immersion of the transition metal in the melt at temperatures below 600° C., particularly at temperatures of about 550° C.

In other aspects of the invention, the alkali metal boron tetraflouride salt is selected from $KBF_4$, $KBF_4$-KF, $NaBF_4$ $NaBF_4$-$KBF_4$ and mixtures thereof. A preferred mixture is $KBF_4$-KF with about 25 mole percent KF.

In one other important aspect of the invention, a method of preparing a current collector structure for high temperature electrochemical cells is provided. The current collector is particularly applicable for use in a positive electrode having $FeS_2$ as active material within an electrochemical cell employing a molten metal halide salt as electrolyte. The current collector is prepared by providing a current collector substrate including a transition metal. A bath or melt of an alkali metal boron tetraflouride salt including a dissolved boron containing material is prepared and the transition metal substrate immersed in the melt at a temperature of less than 700° C. for a sufficient time to form a corrosive resistant and hardened layer of transition metal boride on the surface of the substrate.

In more particular aspects, the preferred transition metal for such a current collector includes nickel or iron. The alkali metal tetraflouride salt comprises a mixture with a major proportion of $KBF_4$ and a minor proportion of KF sufficient to provide a molten bath at a temperature below 600° C. The boron containing material is preferably NiB, $CrB_2$ or $MnB_2$.

BRIEF DESCRIPTION OF THE DRAWINGS

The present invention as illustrated in the accompanying figures wherein FIGS. 1a, 1b, 1c and 1d are each a metallographic photograph at 500× showing a boride layer on a nickel substrate.

DETAILED DESCRIPTION OF THE PREFERRED EMBODIMENT

The method of the present invention can be employed to prepare boride coatings on transition metal substrates in an effort to make the substrates more corrosive resistant or to provide hardened surfaces suitable for various machining or mechanical applications. In particular, the method can be used for providing a corrosive resistant coating to a current collector substrate suitable for use in a high temperature, molten metal halide electrolyte environment such as that within a high temperature secondary electrochemical cell. For this later application, substrates of nickel or iron and their alloys are of particular interest. However, there may be applications in which other substrates such as cobalt or other transition metals or alloys will benefit by a boride outer coating.

In preparing the boride coating, a melt of an alkali metal boron tetraflouride salt or salt mixture is prepared. One suitable material is potassium boride tetraflouride. To lower the melting point of the melt and to enhance the solubility of a boron containing material to be added subsequently, an additional salt such as potassium flouride at a minor proportion of about 20-30 mole percent is advantageously added to the potassium boride tetraflouride. The presence of the potassium flouride can be used to reduce the melting point of the mixture from about 530 to 460° C. The preferred mixture of these two salts is the eutectic composition including 25 mol percent KF and 75 mol percent $KBF_4$, which has a melting point of 460° C. Other salts contemplated for use in this application include sodium boride tetraflouride and a mixture of sodium boride tetraflouride and about 10 mole percent potassium boride tetraflouride. These materials have somewhat reduced melting points over $KBF_4$ but have demonstrated somewhat less capacity for effecting boride layers of sufficient thickness on the substrate.

A boron-containing material such as a metal boride is added to the boron tetraflouride salt. The material is advantageously added as a finely divided powder to disperse and partially dissolve in the melt. As the boron containing material is depleted in the boronizing of the substrate surface, the undissolved dispersed portion may then enter the solution to sustain the process.

Various boron containing materials can be employed as the boron source in forming a metal boride coating on a transition metal substrate. Metal borides, elemental boron and other boron compounds such as boron carbides or boron silicides are contemplated as suitable boron containing materials. The inventors have found that metal borides, particularly those having a high ratio of boron to the metal, that is the higher borides are preferred. It is believed that the higher boron activity within these metal borides spontaneously drives the reaction of the boron source with the substrate material to form a protective boride coating. Elemental boron, although having a high activity does not appear to dissolve within the melt to the extent of the selected metal borides and consequently has not provided as thick a boride layer as that of the preferred metal borides.

It is also desirable to select a boron containing material that will provide a single phase or substantially single phase boride layer on the substrate. In this respect and in respect to relatively high boron activity, NiB, $CrB_2$, $MnB_2$, FeB, $ZrB_{12}$ and $GdB_6$ are preferred as boron containing materials to be dissolved in the melt for providing a boride layer on a transition metal substrate.

In treating the transition metal substrate to coat it with a metal boride layer, the substrate is first formed into the desired structure. For instance, a mesh or perforated metal sheet is provided for use as a current collector within an electrode for a high temperature secondary electrochemical cell. A melt of alkali metal boron tetraflouride is prepared by heating such material to above its melting point and the selective boron containing material dissolved and/or dispersed into the melt. The substrate is then immersed in the melt, held at a temperature of no more than 700° C. for a period of time sufficient to coat the substrate with a metal boride layer. Typically about 24 hours immersion of the substrate is adequate for the more active boron containing materials. The substrate having the boride coating is then removed from the melt, cooled and made ready for use, for instance by assemblying within the electrode of a secondary electrochemical cell.

The following examples are presented merely to illustrate the present invention.

EXAMPLE I

A molten salt melt of about 200 grams of $KBF_4$ was prepared at 600° C. and sufficient NiB as a finely divided powder added to form about a 10 weight percent mixture. A small sheet of nickel metal was cleaned, polished, and immersed in the melt covered by argon gas and left for a period of about 24 hours. Subsequently, the sample sheet was analyzed by x-ray diffraction analysis and the boride layer measured by an optical microscope. A layer of about 51 micrometers thick of substantially $Ni_2B$ with small amounts of $Ni_4B_3$ was found. The two nickel borides were blended in a random phased distribution throughout a single boride layer.

EXAMPLE II

Alternative Molten Salts

The melt was prepared as in Example I, except that sufficient KF was added to the $KBF_4$ to provide a mixture containing 25 mole percent KF, the eutectic composition of $KBF_4$-KF. The nickel substrate was treated as in Example I except at 550° C. A nickel boride layer of about 46 micrometers of the same composition as in Example I was found thus illustrating the advantageous use of KF additive to permit operation at a lower temperature with decreased risk of forming micrometers size cracks in the boride coating as the substrate is cooled to room temperature.

Other molten salt materials were employed for the melt and varying temperatures used to deposit a boron layer on nickel substrates. In each case the resulting layer included substantially all $Ni_2B$ with small amounts of $Ni_4B_3$ randomly distributed within a single boride layer. The results are given in Table I.

TABLE I

| Boride Coatings Formed in Molten Salt Baths | | | |
|---|---|---|---|
| Molten Salt | Melting Point | Temp. °C. | Thickness μm |
| $KBF_4$ | 530 | 670 | 81 |
| | | 600 | 51 |
| | | 550 | 12 |
| $KBF_4$—KF (25 mol %) (eutectic composition) | 460 | 550 | 46 |
| | | 500 | 4 |
| $NaBF_4$ | 408 | 550 | 11 |
| | | 500 | 5 |
| $NaBF_4$—$KBF_4$ (10 mol %) (minimum composition) | 398 | 550 | 11 |
| | | 500 | 4 |

EXAMPLE III

Alternate Substrates

A melt of $KBF_4$ with about 10 weight percent NiB was prepared as in Example I and a sheet of cobalt immersed in the melt for a period of 24 hours at 600° C. Analysis by x-ray diffraction and optical microscope showed a single layer of CoB of about 32 micrometers thick.

Other substrates were treated in the same manner and the results shown in Table II given below.

TABLE II

| Boride Coatings Formed on Metal Substrates | | |
|---|---|---|
| Substrate Metal | Thickness μm | Borides Identified |
| Ni | 51 | $Ni_2B$, $Ni_4B_3$ |
| Co | 32 | CoB |
| Fe | 21 | $Fe_2B$, FeB |
| Mo | nil | — |
| Ta | 0 | — |
| Ti | — | — |
| Nb | 0 | — |
| Hastelloy B | 5 | — |

The boron layers formed on the iron substrate included $Fe_2B$ and FeB in separate layers which may contribute to the deterioration of this protective coating in a corrosive environment subjected to thermal cycles. It is thus seen that a nickel substrate and possibly a cobalt substrate are particularly well suited for treatment by the present method to apply a protective boride coating on their surfaces.

EXAMPLE IV

Other Boron Source Materials

The method of Example I was carried out except that sufficient $CrB_2$ was added to the $KBF_4$ melt to provide a 7.5 weight percent mixture. A nickel substrate specimen was treated as before and found to include a single layer of $Ni_2B$ of about 40 micrometers thickness.

A large number of other boron containing materials were tested in the same manner and the results presented in Table III.

TABLE III

Summary of Boride Coating Formed on Nickel Substrates From $KBF_4$ Melt.

| Boron Source | | | Borides Identified | | |
|---|---|---|---|---|---|
| Compound | Conc. Wt % | Thickness μm | $Ni_3B$ | $Ni_2B$ | $Ni_4B_3$ |
| B | 7.9 | 23 | W | S | — |
| $B_4C$ | 5 | 23 | W | S | — |
| $Al\,B_{12}$ | 7.7 | 29 | — | S | — |
| $B_4Si$ | 5 | 17 | W | S | — |
| $B_6Si$ | 5 | 23 | — | S | — |
| $TiB_2$ | 7.5 | 12 | M | M | — |
| $VB_2$ | 7.5 | 0 | — | — | — |
| CrB | 7.5 | nil | M | M | — |
| $CrB_2$ | 7.5 | 40 | — | S | — |
| MnB | 7.5 | 6 | M | M | — |
| $MnB_2$ | 7.5 | 52 | — | S | — |
| $Fe_2B$ | 7.5 | 33 | M | M | — |
| FeB | 11 | 35 | VW | S | — |
| $Co_3B$, $Co_2B$ | 16 | 12 | M | M | — |
| $Ni_3B$ | 9.8 | nil | M | M | — |
| $Ni_2B$ | 9.8 | 9 | M | M | — |
| NiB | 10–20 | 80–120 | — | S | W |
| $ZrB_2$ | 14 | 23 | W | S | M |
| $ZrB_{12}$ | 7.4 | 46 | W | S | VW |
| NbB | 14 | 6 | — | M | — |
| $NbB_2$ | 9.8 | 0 | — | — | — |
| $Mo_2B$ | 15 | VW: — | — | — | — |
| MoB | 14 | 0 | — | — | — |
| $MoB_2$ | 7.5 | 29 | W | S | — |
| $Mo_2B_5$ | 7.5 | 6 | M | M | — |

TABLE III-continued

Summary of Boride Coating Formed on Nickel Substrates From $KBF_4$ Melt.

| Compound | Boron Source Conc. Wt % | Thickness μm | Borides Identified $Ni_3B$ | $Ni_2B$ | $Ni_4B_3$ |
|---|---|---|---|---|---|
| $TaB_2$ | 9.8 | 6 | — | — | — |
| $W_2B_5$ | 17.5 | 23 | W | S | — |
| $CaB_6$ | 7.5 | 12 | W | S | — |
| $BaB_6$ | 10 | 17 | W | S | — |
| $CeB_6$ | 10 | 23 | S | M | — |
| $GdB_6$ | 16 | 35 | W | S | — |

S: strong,
M: medium,
W: weak,
VM: very weak

From an examination of Table III it can be seen that the preferred boron containing materials are NiB, $CrB_2$, $MnB_2$, FeB, $ZrB_{12}$ and $GdB_6$. After a 24 hour treatment, each of these boron containing materials provided at least a 30 micrometer thick protective boride coating on the substrate that included either a single phase of $Ni_2B$ or a strong phase having randomly distributed amounts of particularly $Ni_3B$ and in some instances traces of $Ni_4B_3$. It is expected that in each of these preferred boron containing materials, effective coatings could be prepared through use of a molten salt in the melt comprising $KBF_4$ and the eutectic concentration of KF to either permit lowering the treatment temperature or the deposition of thicker coatings at the same temperature.

EXAMPLE V

A melt was prepared containing $KBF_4$ and about 10 weight percent FeB at about 600° C. An iron substrate treated as described above was immersed in the melt for a period of 65 hours and examined to find a coating of about 50 micrometers thickness comprising separate layers of FeB and $Fe_2B$.

Referring to the Figures, metallographical photographs are presented showing nickel boride layers each designated 11 on a nickel substrate each designated 13. The boride layers were deposited on the substrates generally in the manner described above in the Examples. Table IV given below shows the materials identified in the boron layer, the boron containing material employed within the melt and the temperature of application. The boride layer shown in FIG. 1-d was prepared in a melt including 25 mole percent KF within the $KBF_4$. Consequently, the lower temperature of 550° C.

TABLE IV

| FIG. No. | Boride Layer | Boron Source | Temp. °C. |
|---|---|---|---|
| FIG. 1-a | $Ni_2B$ | $CrB_2$ | 670 |
| FIG. 1-b | $Ni_2B$ | $MnB_2$ | 670 |
| FIG. 1-c | $Ni_2B$—$Ni_4B_3$ | NiB | 670 |
| FIG. 1-d | $Ni_2B$—$Ni_4B_3$ | NiB | 550 |

It can be seen from examining the Figures that nickel boride layers are produced that are firmly bonded to the nickel substrate and that there is no evidence of separation of the layers or cracks through the boride layers. It is also seen in Fig. 1-d that an uniform layer of at least two nickel borides is formed at a temperature as low as 550° C. by the method of present invention.

In view of the above examples and descriptions it is seen that the present invention provides an improved method for providing a protective coating of metal boride on substrates that are to be used in corrosive and high temperature environments or in mechanical applications where hardening to reduce mechanical wear is desirable. The method is particularly well suited for nickel substrates but may also have application for cobalt and iron substrates. Additives are presented to lower the melting temperature and increase the solubility of selected boron containing materials within the melt and thus provide a more effective coating with minimal risk of cracking due to thermal cycling. The coatings on nickel and cobalt metal are provided as single phase layers of substantially single boride compound but in some instances with small amounts of other borides randomly distributed within the layer.

Although the present invention has been described in terms of specific materials and process steps, it will be clear to one skilled in the art that various changes can be made within the scope of the invention as defined in the appended claims.

The embodiments of this invention in which an exclusive property or privilege is claimed are defined as follows:

1. A method of preparing a corrosion resistant coating on a transition metal substrate comprising:
   preparing a melt including an alkali metal boron tetraflouride salt;
   dispersing and at least partially dissolving a particulate transition metal boride in said melt; and
   immersing said transition metal in said melt, while said melt is at a temperature of no more than 700° C., to form a surface layer on said transition metal containing a transition metal boride.

2. The method of claim 1 wherein said transition metal is nickel.

3. A method of boronizing a transition metal comprising:
   preparing a melt including an alkali metal boron tetrafluoride salt;
   dissolving a boron containing material selected from the group of metal boride compounds consisting of $CrB_2$, $MnB_2$, NiB, FeB, $ZrB_{12}$ and $GdB_6$ in said melt; and
   immersing said transition metal in said melt at a temperature of no more than 700° C. to form a surface layer on said transition metal containing a transition metal boride.

4. The method of claim 3 wherein said boron containing material is selected from the group consisting of $CrB_2$, $MnB_2$ and NiB.

5. The method of claim 1 wherein said melt includes in mixture a minor proportion of KF sufficient to lower the melting point of the mixture.

6. The method of claim 5 wherein the transition metal is immersed in said melt at a temperature of about 550° C.

7. The method of claim 1 wherein said alkali metal boron tetraflouride salt is selected from the group of such salts consisting of $KBF_4$, $KBF_4$-KF, $NaBF_4$ $NaBF_4$-$KBF_4$ and mixtures thereof.

8. The method of claim 7 wherein said alkali metal boron tetraflouride salt is $KBF_4$ in mixture with a minor proportion of KF.

9. A method of preparing a current collector structure for a high temperature electrochemical cell employing a molten metal halide salt as electrolyte comprising:

providing a current collector structure comprising a transition metal substrate;

providing a melt of alkali metal boron tetraflouride salt including a dissolved boron containing material, said boron containing material selected from the group of metal boride compounds consisting of $CrB_2$, $MnB_2$, NiB, FeB, $ZrB_{12}$ and $GdB_6$; and immersing said substrate in said melt, while said melt is at a temperature of less than 700° C., to form a corrosion resistant layer of transition metal boride on the surface of the substrate.

10. The method of claim 9 wherein said transition metal is selected from the group of transition metals consisting of Ni and Fe, said alkali metal tetraflouride salt comprising a mixture of a major proportion of $KBF_4$ and a minor proportion of KF, and said boron containing material comprising NiB, $CrB_2$ or $MnB_2$.

* * * * *